Nov. 14, 1967 J. A. COMBS 3,353,007

FEED CONTROL DELAY MEANS

Filed May 13, 1963 2 Sheets-Sheet 1

INVENTOR
JERRY A. COMBS

BY Louis A. Kline
Albert L. Sessler, Jr.
HIS ATTORNEYS

Nov. 14, 1967 J. A. COMBS 3,353,007

FEED CONTROL DELAY MEANS

Filed May 13, 1963 2 Sheets-Sheet 2

INVENTOR
JERRY A. COMBS

BY Louis A. Kline
Albert L. Sessler, Jr.
HIS ATTORNEYS

United States Patent Office 3,353,007

Patented Nov. 14, 1967

3,353,007
FEED CONTROL DELAY MEANS

Jerry A. Combs, Dayton, Ohio, assignor to The National Cash Register Company, Dayton, Ohio, a corporation of Maryland Filed May 13, 1963, Ser. No. 280,058
9 Claims. (Cl. 235—61.11)

ABSTRACT OF THE DISCLOSURE

A feed control circuit for record media handling devices capable of delaying initiation of a feed operation when the feed movement to be caused by the operation is in a direction opposite to the direction of the last movement of the record media, while enabling immediate initiation of a feed operation when the feed movement to be caused by the operation is in the same direction as the last movement of the record media. Various gating and delay elements, a monostable multivibrator, and a bistable element are combined to achieve the desired result.

This invention relates generally to feed control means for record media handling devices, and relates particularly to feed control delay means associated with such devices, for delaying initiation of a feed operation when the feed movement to be caused by the operation is in a direction opposite to the direction of the last movement of the record media.

In order to realize the full potential from the extremely high operating speeds of modern computing and data-processing devices, it is important that information which is to be utilized by these devices be entered into them at as rapid a rate as possible. In the case of such input devices as readers for reading perforated tape or similar record media, this means that high acceleration and reading rates of the tape must be utilized. When tape is sensed by a tape reader, it is often desirable that the tape be rewound on its supply reel to permit it to be sensed again at a later time, or perhaps to permit it to be read in the reverse direction for some special purpose. This reverse movement should also be carried out at the highest possible speed, in order to provide maximum utilization of the tape reader.

It will readily be seen that if the tape or other record media, and associated equipment such as the tape supply and take-up reels, are moving at high speeds, and particularly if the take-up reel is nearly full, a sudden command to the tape reader to reverse the direction of tape movement is likely to cause excessive tension in the tape, due to the inertia of the moving parts associated with the tape or other record media. This excessive tension is likely to break the tape, or, at least, to energize a safety device of a conventional type on the reader, which will halt its operation.

The present invention overcomes this difficulty by providing electronic delay means which are energized whenever there is a reversal in the direction of movement of the record media, to permit movement in one direction to substantially terminate before movement in the other direction is commenced. Thus if the tape is moving in a forward direction and it is desired to reverse the direction of movement, the termination of the signal for forward movement is made effective immediately, while application of the signal for backward movement to the appropriate mechanism is delayed for a sufficient time to permit the tape or other record media to substantially halt its movement. A similar sequence of operation takes place when the tape is moving in a backward direction, and a signal is received by the tape reader for initiation of movement in a forward direction.

However, it is not desired to provide this delay between successive movements of the tape in the same direction, since this would unduly slow the operation of the tape reader. Accordingly, means are provided to enable signals for continuing movement of the tape or other record media, in the same direction as it has been moving, to be applied immediately to the appropriate mechanism. The desired results are obtained by the use of the novel circuitry included in the present invention.

It is accordingly an object of the present invention to provide means, in a record media handling device, whereby a delay can be imposed upon signals which change the direction of movement of the record media, while normally permitting signals for continuing the same direction of movement of the record media to be applied without delay to the appropriate mechanism for controlling movement of the record media.

Another object is to provide an improved feed control circuit for the record media handling means.

A further object is to provide, in a record media handling device, selectively operable feed control delay means.

With these and other objects, which will become apparent from the following description, in view, the invention includes certain novel features of construction and combinations of parts, one form or embodiment of which is hereinafter described with reference to the drawings which accompany and form a part of this specification.

Figure 1:
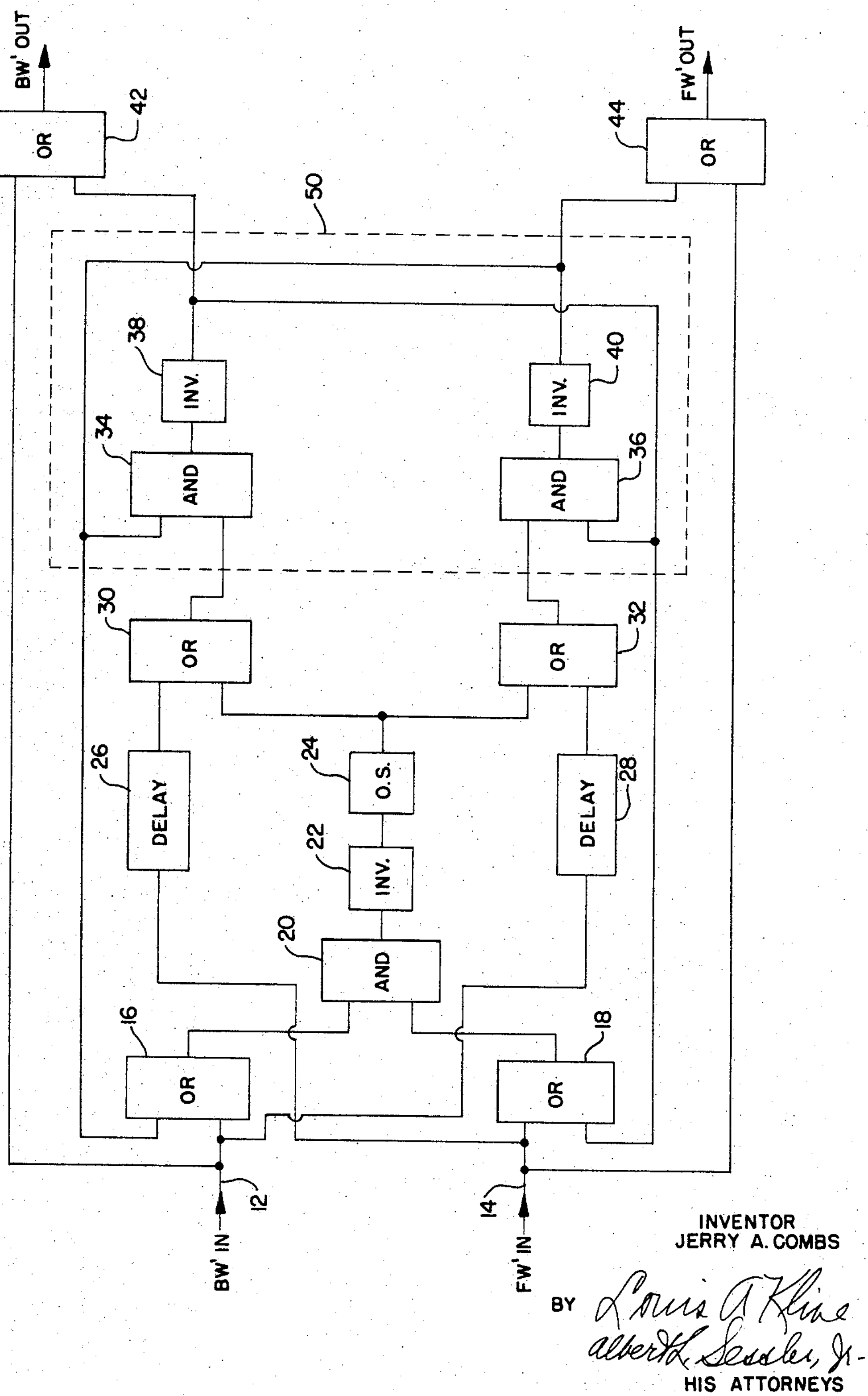
FIG. 1 is a logical block diagram of a feed control delay circuit constructed according to the principles of the present invention.

Referring now to FIG. 1, the block diagram shown there includes a number of types of circuit elements, such as AND gates, OR gates, inverters, delay elements, and a monostable multivibrator element, or "one shot." Suitable circuits for the AND gates, OR gates, inverters, and the monostable multivibrator element are shown and described in the United States Patent No. 3,067,934, issued on Dec. 11, 1962, to Gene L. Amacher and John F. Paugstat. Several suitable constructions for delay elements are shown and described in chapter 10 (pages 286 to 322 inclusive) of the book "Pulse and Digital Circuits," by Millman and Taub, published in 1956 by McGraw-Hill Book Company, Inc., New York, N.Y., United States of America. It should be understood, of course, that many other types of circuits are available for performing the functions of these various elements, and could be used, if desired, in the present invention.

In the embodiment of the invention shown in FIG. 1, a pair of input leads 12 and 14 are provided to receive input signals, relating to movement of the record media, from a computing or data-processing device, or from some other source. The signal BW′ to cause backward movement of record media is applied to the lead 12, while the signal FW′ to cause forward movement of record media is applied to the lead 14. In both instances, in the illustrated embodiment, the selection of circuit parameters is such that the signal produces the desired result when it is at its lower, or false, level, and is ineffective to cause movement of the record media when it is at its upper, or true, level. In the illustrated embodiment of the invention, the true level is 0 volt D.C., and the false level is −8 volts D.C. However, it will be clear that other logical levels of operation could be chosen, by appropriate selection of circuit parameters. Similarly, different component values, delay durations, etc., from those disclosed in the illustrated embodiment of the invention could be chosen if desired.

The input lead 12 is connected to one input of an OR gate 16; is also connected to one input of an OR gate 42;

and is also connected through a delay element 28, which provides a six-microsecond delay in the illustrated embodiment, to one input of an OR gate 32. Similarly, the input lead 14 is connected to one input of an OR gate 18; is also connected to one input of an OR gate 44; and is also connected through a delay element 26, which provides a six-microsecond delay in the illustrated embodiment, to one input of an OR gate 30.

An additional input to the OR gate 16 comes from one output of a bistable element shown generally at 50, which may be composed of two AND gates and two inverters, as will subsequently be more fully described. Similarly, an additional input to the OR gate 18 comes from a second output of the bistable element 50.

The outputs of the two OR gates 16 and 18 are connected to the two inputs of an AND gate 20, the output of which is connected through an inverter 22 to the input of a monostable multivibrator, or "one shot," 24, which is capable of generating an output signal of predetermined duration, which is 350 milliseconds in the illustrated embodiment, in response to a change of input signal level from false to true. The output of the "one shot" 24 is connected to a second input of the OR gate 30 and to a second input of the OR gate 32. The outputs of the OR gates 30 and 32 are connected to the two inputs of the bistable element 50.

It will be apparent that, if desired, some other suitable arrangement of signal-generating means could be used in place of the illustrated combination of the OR gates 16, 18; the AND gate 20; the inverter 22; and the "one shot" 24, or in place of a sub-combination of these elements.

Any one of a number of conventional well-known types of bistable elements may be used as the element 50, to produce the desired two output signals. Shown in FIG. 1 is a bistable element constructed by combining two AND gates 34, 36 and two inverters 38, 40. The AND gate 34 derives one of its inputs from the output of the OR gate 30, and derives the other of its inputs from the output of the inverter 40, which inverts the output of the AND gate 36. Similarly, the AND gate 36 derives one of its inputs from the output of the OR gate 32, and derives the other of its inputs from the inverter 38, which inverts the output of the AND gate 34. This arrangement of AND gates 34, 36 and inverters 38, 40 is one means by which a bistable element 50, having the desired characteristics for use in the system represented by the diagram of FIG. 1, can be realized.

The output of the inverter 40 also forms one of the outputs of the bistable element 50, and, in addition to being applied to one input of the AND gate 34, is connected to one input of the OR gate 16, as previously described. In addition, it is also connected to one input of the OR gate 44, the other input of which, it will be recalled, is connected to the input lead 14. The output of the OR gate 44 provides the "forward" output means for the embodiment of the invention shown in FIG. 1.

The output of the inverter 38, in addition to being applied to one input of the AND gate 36, forms the second of the two outputs of the bistable element 50, and is connected to one input of the OR gate 18, as previously described. In addition, it is also connected to one input of the OR gate 42, the other input of which, it will be recalled, is connected to the input lead 12. The output of the OR gate 42 provides the "backward" output means for the embodiment of the invention shown in FIG. 1.

Figure 2:
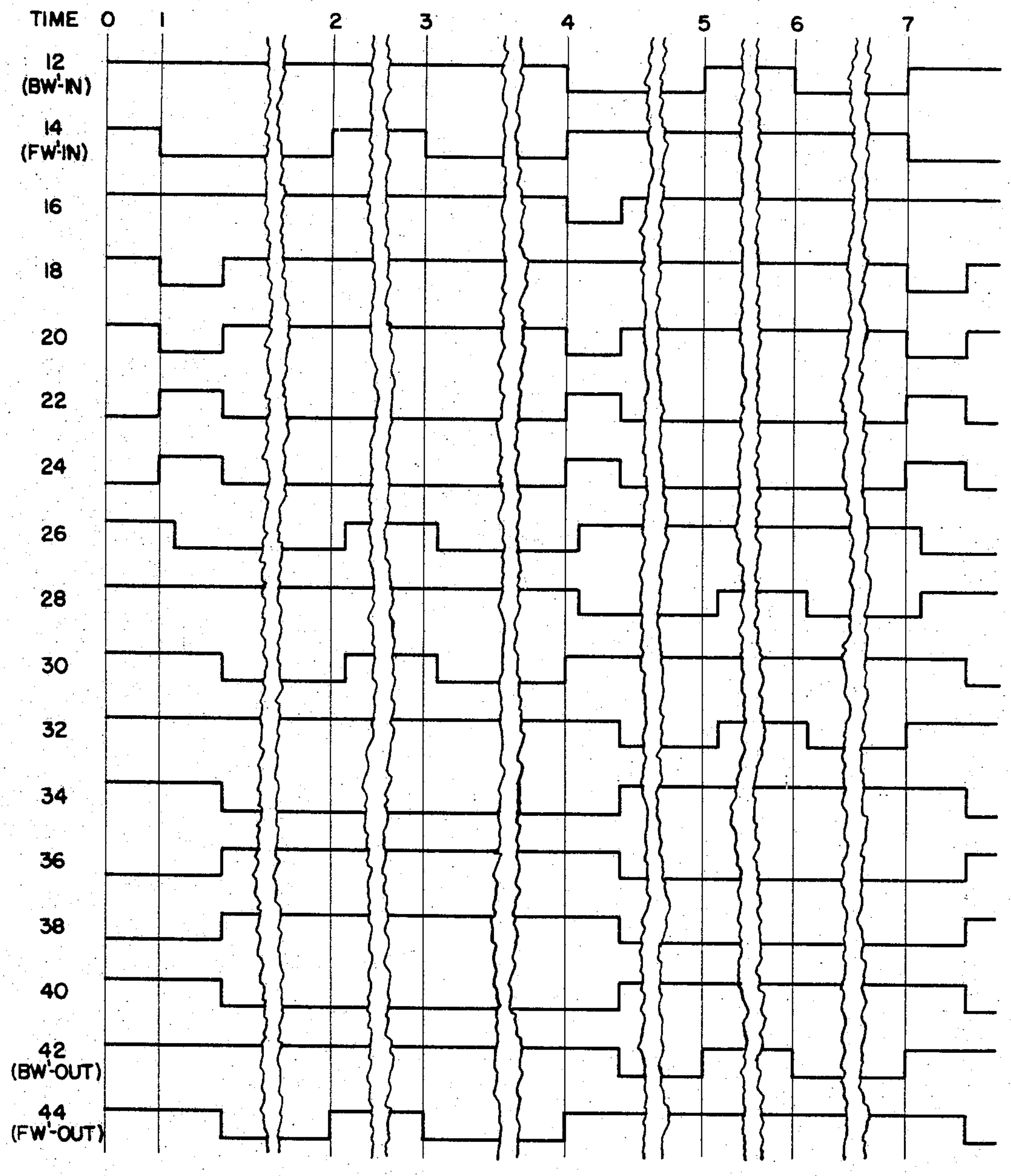
FIG. 2 shows a plurality of wave forms associated with various elements of the circuit represented in the diagram of FIG. 1.

The mode of operation of the system shown in the block diagram of FIG. 1 will now be briefly described, with the aid of various wave forms shown in FIG. 2, which are merely representative of signal levels and are not drawn to any scale. These wave forms are arranged vertically, in order that their time relationship may be readily ascertained. For convenience in referring to the diagram of FIG. 2, a scale of time intervals from zero to 7 appears across the top of the figure. When reference to a particular time interval is made, it will hereafter be referred to with respect to this scale, as, for example, $T_1$, $T_2$, etc. All of the wave forms are shown at one of the two previously-described logical levels at which the system operates.

The various wave forms are designated at the left of FIG. 2 by reference characters corresponding to the various elements of FIG. 1, and these wave forms represent the signals at the outputs of the various elements. Thus, for example, the wave forms designated 12 and 14 represent the "backward" movement and "forward" movement input signals BW′ and FW′, respectively, on the input leads 12 and 14; the wave forms designated 16 and 18 represent the signals at the outputs of the OR gates 16 and 18; and the wave forms 42 and 44 represent the signals on the output leads of the system of FIG. 1, which output signals are the signals at the outputs of the OR gates 42 and 44.

It will be assumed, for purposes of illustration, that at an initial starting time $T_0$, the record media handling device is at rest and that input signals FW′ and BW′ are in a true condition, so that there has been no command from the associated computing or data-processing device to initiate movement of the record media in either direction. With the record media handling device at rest, and with both signals FW′ and BW′ in a true condition, the signal levels at the outputs of the various elements of the system of FIG. 2 can be in either one of two possible combinations of conditions, and a first one of these combinations of conditions will be assumed at time $T_0$. As will be subsequently described, the second of these two possible combinations of conditions is shown following time $T_2$.

Now let it be assumed that at time $T_1$, a signal for forward movement of the record media is generated by the computing or data-processing device, so that the level of the "forward" input signal FW′ on lead 14 goes from true to false, while the level of the "backward" input signal BW′ on the lead 12 of course remains true.

The signal change to a false level on the lead 14 is applied to one input of the OR gate 44, but has no effect upon the signal level of the "forward" output of the gate 44, since the signal on the other input to the OR gate 44 remains true.

The signal on the output of the OR gate 16 remains true, since the signal BW′ on lead 12 remains true. Similarly, the signal on the "backward" output of the OR gate 42 remains true.

The signal on the output of the OR gate 18 goes false, since one input of that gate is connected to the output of the inverter 38, on which a false signal appears, while the other input of the gate 18 is connected to the lead 14, on which the signal level has gone to false.

Since the signal level on the input to the AND gate 20 from the OR gate 18 is false, the signal level on the output of the AND gate 20 goes to false, causing the signal on the output of the inverter 22 to shift from a false level to a true level. This signal change, which is applied to the input of the "one shot" 24, triggers said "one shot," causing it to generate a true-level pulse of 350-milliseconds' duration.

This signal-level change from false to true on the output of the "one shot" 24 is applied to one input of each of the OR gates 30 and 32. At this instant, the signals at the other inputs of the gates 30 and 32 are also positive. However, a very short time later (six microseconds in the illustrated embodiment), the signal change on the lead 14 is transmitted through the delay element 26 to cause the signal level on one input of the gate 30 to drop to false. Since the signal level at the other input of the OR gate 30 is true, this change has no effect at this time on the condition of the output signal from the gate 30.

Since the signal levels at both inputs of the OR gate 32 are also true at this time, the signal level on its output also remains true.

As has been indicated, the outputs of the OR gates 30 and 32 are connected to the inputs of the bistable element, 50, which, in the illustrated embodiment, is made up of the two AND gates 34, 36 and the two inverters 38, 40. Since there is no change in signal level on the inputs of the bistable element 50, the signal levels on the outputs of its various elements remain the same; namely, true in the case of the gate 34 and the inverter 40, and false in the case of the gate 36 and the inverter 38. The two outputs of the bistable element 50, corresponding to the outputs of the inverters 38 and 40, are accordingly at signal levels of false and true, respectively.

At approximately 350 milliseconds after the change in input signal level from true to false was impressed upon the forward input lead 14, the true-level signal generated by the "one shot" 24 is terminated, and the signal level on the output of the "one shot" goes to false, which causes a swing to a false level on inputs of the OR gates 30 and 32. This produces no effect on the signal level of the output of the gate 32, since the other input of said gate is still at a true signal level. However, the other input of the OR gate 30, it will be recalled, is now at a false signal level, so that the output signal of the gate 30 now swings to a false level.

This, in turn, causes the output of the AND gate 34 to change to a false signal level, which produces a true signal level on the output of the inverter 38. Therefore a true signal level is produced on one input of the OR gate 42. Since the signal level at the other input of this gate has remained true, there is no change produced on the output of this gate, which is the "backward" output lead of the system of FIG. 1. A true signal level is also produced on one input of the OR gate 18, which is connected to the output of the inverter 38. The signal on the output of the gate 18 is thus returned to a true level. Finally, the signal level on one input of the AND gate 36, connected to the output of the inverter 38, is changed from false to true. Since the other input of the gate 36, connected to the output of the gate 32, is also at a true level, the signal level on the output of the gate 36 goes from false to true, which causes the output of the inverter 40 to go from a true to a false signal level.

Since both of the inputs of the OR gate 44 are now at a false signal level, the output of this gate, which is the "forward" output signal lead of the system of FIG. 1, goes to a false signal level, which is effective to energize the apparatus (not shown) for causing forward movement of the record media. The 350-millisecond delay which was imposed in this example between receipt of the FW′ signal by the system of FIG. 1, and its transmittal, has no purpose, and is simply a result of the way the system was set in the example. On subsequent "forward" movement signals, there will be no delay, as will subsequently be described. Since the delay takes place only when the system is at rest under certain conditions, and when a reversal in the direction of movement is ordered, it does not seriously affect the operating speed of the record media handling device. Under normal conditions, when the system receives a "forward" signal, then a halt, then another "forward" signal, there is no delay, as will be described subsequently. The same thing is true in the case of successive "backward" signals.

Let it now be assumed that after an intervening period of time, a "halt" signal is generated by the computing or data-processing device, so that the "forward" signal FW′ on the lead 14 goes from a false level to a true level, while the backward signal BW′ on the lead 16 remains at a true level. This is shown in FIG. 2 at time $T_2$.

The change in level of the FW′ signal from false to true is applied to one input of the OR gate 44, which causes the output of said gate, which is the "forward" output signal lead of the system of FIG. 1, to switch immediately from a false signal level to a true signal level, thereby terminating the energization of the apparatus (not shown) for moving the record media in a forward direction, and halting said movement.

The change in level of the FW′ signal from false to true also is applied to one input of the OR gate 18, but produces no effect on the output of this gate, since the other input was already at a true signal level.

In addition, the change in level of the FW′ signal is applied through the six-microsecond delay element 26 to one input of the OR gate 30, and changes the output signal level of said gate from false to true. However, this produces no further effect on the system of FIG. 1, since the output of the gate 30 is connected to one input of the AND gate 34, and the other input of said AND gate remains at a false signal level, thereby causing the output of said AND gate also to remain at a false signal level.

The remainder of the elements of the system of FIG. 1 remain in the condition in which they were immediately preceding the termination of the FW′ signal at time $T_2$.

It may be noted that the combination of conditions in which the various elements of the system of FIG. 2 are immediately following time $T_2$ is the second of the two combinations of conditions of elements previously referred to which are possible when both of the signals FW′ and BW′ are at the true signal level. If a signal for forward movement (FW′) is now applied to the lead 14, said signal will be transmitted immediately to the "forward" output lead, without the 350-millisecond delay which occurred when said signal was applied at time $T_1$, in the manner previously described.

Let it be assumed that such a "forward" signal FW′ is applied to the lead 14 at time $T_3$, thereby changing the signal level on the lead 14 from true to false. This signal change is applied to one input of the OR gate 44. Since the signal level is also false at the other input of said gate, the signal level at the output of the gate 44, which is the signal level of the "forward" output lead of the system of FIG. 1, immediately goes to false, thereby causing energization of the apparatus (not shown) for causing forward movement of the record media.

The signal level of one input of the OR gate 18, connected to the lead 14, also goes to false, but produces no effect upon the output of said gate, since the signal level of the other input of the gate 18 remains true. In addition, the change on the lead 14 to a false signal level is transmitted through the six-microsecond delay element 26, to one input of the OR gate 30. This causes the output of the OR gate 30 to assume a false signal level. However, this produces no further effect, since the output of the OR gate 30 is connected to one input of the AND gate 34, the output of which is already at a false signal level.

The remainder of the elements of the system of FIG. 1 remain in the condition in which they were immediately preceding the application of the FW′ signal at time $T_3$.

Let it now be assumed that record media is moving in a forward direction through the record media handling device, and that at time $T_4$ there is a simultaneous termination of the "forward" signal on lead 14 and initiation of a "backward" signal on lead 12. Thus the signal FW′ goes to a true level at this time, and the signal BW′ goes to a false level. The change of signal level on the lead 12 from true to false is applied to one input of the output OR gate 42, but has no immediate effect, since the other input of said gate is still at a true signal level.

The change of signal level on the lead 14 from false to true is applied to one input of the OR gate 18, but produces no change in the output of that gate, which is already at a true level. The change in signal level on the lead 14 from false to true is also applied to one input of the OR gate 44, and causes the output of said gate to change immediately to a true signal level, thus terminating the output signal for forward movement of the record media.

The change of signal level on the lead 12 from true to false is applied to one input of the OR gate 16, and causes the output of said gate to change to a false level, since the other input of the gate 16 is also at a false level at this time.

Since the outputs of the gates 16 and 18 serve as inputs of the AND gate 20, the output of said AND gate now goes from a true signal level to a false signal level, causing the output of the inverter 22 to go from a false signal level to a true signal level. As previously described, the output of the inverter 22 is connected to the input of the "one shot" 24, and the change in signal level from false to true on the output of the inverter causes triggering of the "one shot" to produce a true-level pulse of 350 milliseconds' duration. This pulse is applied to one input of each of the OR gates 30 and 32. The output of the OR gate 30 thus is changed from a false signal level to a true signal level, while the output of the OR gate 32 remains at a true signal level.

The change of signal level from true to false on the lead 12 is also transmitted through the delay element 28 and, after a six-microsecond delay, is applied to an input of the OR gate 32. However, since the signal level on the other input of the OR gate 32 has previously gone to true due to the pulse from the "one shot" 24, this has no effect upon the output of the gate 32, which remains at a true signal level.

The change of signal level from false to true on the lead 14 is also transmitted through the delay element 26 and, after a six-microsecond delay, is applied to an input of the OR gate 30. In this case also, since the other input of the OR gate 30 has previously gone to a true signal level due to the pulse from the "one shot" 24, this has no effect upon the output of the gate 30, which remains at a true signal level.

As previously described, the outputs of the OR gates 30 and 32 are connected to inputs of the AND gates 34 and 36. With true-level signals applied to these inputs, the signal levels at the outputs of the AND gates 34 and 36 are not changed from the false and true levels, respectively, at which they were immediately preceding time $T_4$, and therefore the signal levels at the outputs of the inverters 38 and 40 are not altered from the true and false levels, respectively, at which they were immediately preceding time $T_4$.

At the expiration of a period of 350 milliseconds following time $T_4$, the true-level pulse at the output of the "one shot" 24 is terminated, and the signal level on that output returns to false. This change is applied to inputs of the OR gates 30 and 32. In the case of the OR gate 30, no effect is produced by this change, since a true signal is applied to the other input. However, in the case of the OR gate 32, a false signal is applied to the other input as well, and the signal on the output of the gate 32 accordingly changes from a true level to a false level.

Since the output of the OR gate 32 is connected to one input of the AND gate 36, the signal change to a false level on the output of the gate 32 causes a corresponding change to a false signal level on the output of the AND gate 36, resulting in a change to a true signal level on the output of the inverter 40. This change is applied to one input of the OR gate 44, where it has no effect, since the output of the gate 44 is already at a true level.

In addition, the change in signal level from false to true on the output of the inverter 40 is applied to one input of the OR gate 16, which causes the signal level on the output of said OR gate to go from false to true. This, in turn, causes the output of the AND gate 20 to go from a false level to a true level, which causes the output of the inverter 22 to go from a true level to a false level. This has no effect on the "one shot" 24, which is only triggered by a change on its input from a false level to a true level.

The change in signal level on the output of the inverter 40 is also applied to one input of the AND gate 34. Since the other input of this AND gate is also at a true signal level, the output of said AND gate changes to a true signal level, which causes the output of the inverter 38 to change to a false signal level.

The signal change on the output of the inverter 38 is also applied to one input of the AND gate 36, which it has no effect at this time, since the other input is also at a false signal level; is applied to one input of the OR gate 18, where it has no effect at this time, since the other input is at a true signal level; and is applied to one input of the OR gate 42, causing the output of said OR gate to change to a false signal level, since the other input of the gate 42 has been at a false input level since time $T_4$.

It will be recalled that the output of the OR gate 42 is also the "backward" output lead of the system of FIG. 1, so that a change in signal to a false level is effective to initiate operation of the apparatus (not shown) for moving the record media in a backward direction. It will be seen that this is accomplished after a time delay of approximately 350 milliseconds, which permits the previous forward movement of the record media to halt before backward movement of the record media commences, thus eliminating a cause of possible excessive tension of the record media.

In FIG. 2, wave forms at the outputs of the various circuit elements of the system of FIG. 1 are shown for various additional changes in the levels of the input signals on the leads 12 and 14. At time $T_5$, is is assumed that the forward movement signal FW′ remains true, while the signal to cause backward movement of the record media is terminated, so that the signal BW′ goes to a true level. At time $T_6$, it is assumed that the forward movement signal remains true, while the signal to cause backward movement of the record media is initiated again, so that its signal level reverts to false. At time $T_7$, it is assumed that a signal for forward movement of the record media is initiated, so that the signal level on the lead 14 goes to false, while the backward movement signal is terminated, causing the signal level on the lead 12 to go to true. In this instance, it will be noted that a delay is imposed before movement of the record media, in a direction reversed from its previous movement, can commence.

The manner in which the system of FIG. 1 functions under these conditions is believed to be obvious from inspection of the various wave forms, particularly in view of the previous description of other operations, and will therefore not be described further.

While the form of device shown and described herein is admirably adapted to fulfill the objects primarily stated, it is to be understood that it is not intended to confine the invention to the form or embodiment disclosed herein, for it is susceptible of embodiment in various other forms.

What is claimed is:

1. In a device of the class described, constructed and arranged to control the feeding of record media in the forward and backward directions, and to cause a delay in exercise of said control when there is a change in the direction of feeding, the combination comprising first signal input means on which a signal to cause backward movement of the record media may be introduced into said device;

second signal input means on which a signal to cause forward movement of the record media may be introduced into said device;

a first OR gate, one of the inputs of which is connected to the first signal input means;

a second OR gate, one of the inputs of which is connected to the second signal input means;

a first AND gate having two inputs, which are connected to the outputs of the first and second OR gates;

first signal inverting means, the input of which is connected to the output of said first AND gate;

monostable multivibrator means, capable of producing a signal of predetermined duration, the input of which monostable multivibrator means is connected to the output of the first signal inverting means;

third and fourth OR gates, one input of each of which is connected to the output of the monostable multivibrator means;

second and third AND gates, one input of each of which is connected to the output of the third and fourth OR gates, respectively;

second and third signal inverting means, the inputs of which are connected to the outputs of the second and third AND gates, respectively;

fifth and sixth OR gates, one input of each of which is connected to the output of the second and third signal inverting means, respectively, the outputs of the fifth and sixth OR gates serving as outputs of said device for the backward control signal and the forward control signal, respectively;

means connecting the first signal input means to a second input of the fifth OR gate;

means connecting the second signal input means to a second input of the sixth OR gate;

first delay means connecting the first signal input means to a second input of the fourth OR gate;

second delay means connecting the second signal input means to a second input of the third OR gate;

means connecting the output of the second signal inverting means to a second input of the second OR gate, and to a second input of the third AND gate; and means connecting the output of the third signal inverting means to a second input of the first OR gate, and to a second input of the second AND gate, whereby said device is capable of immediate transmission of a record media moving signal when the desired direction of movement of the record media is the same as the direction in which the record media was last moved, and whereby said device is capable of delaying a record media moving signal for a predetermined time interval when the desired direction of movement of the record media is opposite to the direction in which the record media was last moved.

2. In a device of the class described, constructed and arranged to control the feeding of record media in the forward and backward directions, and to cause a delay in exercise of said control when there is a change in the direction of feeding, the combination comprising first signal input means on which a signal to cause backward movement of the record media may be introduced into said device;

second signal input means on which a signal to cause forward movement of the record media may be introduced into said device;

a first OR gate, one of the inputs of which is connected to the first signal input means;

a second OR gate, one of the inputs of which is connected to the second signal input means;

an AND gate having two inputs, which are connected to the outputs of the first and second OR gates;

signal inverting means, the input of which is connected to the output of said AND gate;

monostable multivibrator means, the input of which is connected to the output of the signal inverting means;

third and fourth OR gates, one input of each of which is connected to the output of the monostable multivibrator means;

bistable means having a first and a second input connected to the outputs of the third and fourth OR gates, respectively, and having first and second outputs;

fifth and sixth OR gates, one input of each of which is connected to the first and second outputs of the bistable means, respectively, the outputs of the fifth and sixth OR gates serving as outputs of said device for the backward control signal and the forward control signal, respectively;

means connecting the first signal input means to a second input of the fifth OR gate;

means connecting the second signal input means to a second input of the sixth OR gate;

first delay means connecting the first signal input means to a second input of the fourth OR gate;

second delay means connecting the second signal input means to a second input of the third OR gate;

means connecting the first output of the bistable means to a second input of the second OR gate; and means connecting the second output of the bistable means to a second input of the first OR gate, whereby said device is capable of immediate transmission of a record media moving signal when the desired direction of movement of the record media is the same as the direction in which the record media was last moved, and whereby said device is capable of delaying a record media moving signal when the desired direction of movement of the record media is opposite to the direction in which the record media was last moved.

3. In a device of the class described, constructed and arranged to control the feeding of record media in the forward and backward directions, and to cause a delay in exercise of said control when there is a change in the direction of feeding, the combination comprising first signal input means on which a signal to cause backward movement of the record media may be introduced into said device;

second signal input means on which a signal to cause forward movement of the record media may be introduced into said device;

a first OR gate, one of the inputs of which is connected to the first signal input means;

a second OR gate, one of the inputs of which is connected to the second signal input means;

an AND gate having two inputs, which are connected to the outputs of the first and second OR gates;

monostable multivibrator means, the input of which is connected to the output of said AND gate;

third and fourth OR gates, one input of each of which is connected to the output of the monostable multivibrator means;

bistable means having a first and a second input connected to the outputs of the third and fourth OR gates, respectively, and having first and second outputs;

fifth and sixth OR gates, one input of each of which is connected to the first and second outputs of the bistable means, respectively, the outputs of the fifth and sixth OR gates serving as outputs of said device for the backward control signal and the forward control signal, respectively;

means connecting the first signal input means to a second input of the fifth OR gate;

means connecting the second signal input means to a second input of the sixth OR gate;

first delay means connecting the first signal input means to a second input of the fourth OR gate;

second delay means connecting the second signal input means to a second input of the third OR gate;

means connecting the first output of the bistable means to a second input of the second OR gate; and means connecting the second output of the bistable means to a second input of the first OR gate, whereby said device is capable of immediate transmission of a record media moving signal when the desired direction of movement of the record media is the same as the direction in which the record media was last moved, and whereby said device is capable of delaying a record media moving signal when the desired direction of movement of the record media is opposite to the direction in which the record media was last moved.

4. In a device of the class described, constructed and arranged to control the feeding of record media in the forward and backward directions, and to cause a delay in exercise of said control when there is a change in the direction of feeding, the combination comprising first signal input means on which a signal to cause backward movement of the record media may be introduced into said device;

second signal input means on which a signal to cause forward movement of the record media may be introduced into said device;

a first OR gate, one of the inputs of which is connected to the first signal input means;

a second OR gate, one of the inputs of which is connected to the second signal input means;

signal generating means connected to the outputs of the first and second OR gates and capable of producing a signal of predetermined duration in response to a predetermined combination of output signals from the first and second OR gates;

third and fourth OR gates, one input of each of which is connected to the output of the signal generating means;

first and second AND gates, one input of each of which is connected to the output of the third and fourth OR gates, respectively;

first and second signal inverting means, the inputs of which are connected to the outputs of the first and second AND gates, respectively;

fifth and sixth OR gates, one input of each of which is connected to the outputs of the first and second signal inverting means, respectively, the outputs of the fifth and sixth OR gates serving as outputs of said device for the backward control signal and the forward control signal, respectively;

means connecting the first signal input means to a second input of the fifth OR gate;

means connecting the second signal input means to a second input of the sixth OR gate;

first delay means connecting the first signal input means to a second input of the fourth OR gate;

second delay means connecting the second signal input means to a second input of the third OR gate;

means connecting the output of the first signal inverting means to a second input of the second OR gate and to a second input of the second AND gate; and means connecting the output of the second signal inverting means to a second input of the first OR gate, and to a second output of the first AND gate, whereby said device is capable of immediate transmission of a record media moving signal when the desired direction of movement of the record media is the same as the direction in which the record media was last moved, and whereby said device is capable of delaying a record media moving signal when the desired direction of movement of the record media is opposite to the direction in which the record media was last moved.

5. In a device of the class described, constructed and arranged to control the feeding of record media in the forward and backward directions, and to cause a delay in exercise of said control when there is a change in the direction of feeding, the combination comprising first signal input means on which a signal to cause backward movement of the record media may be introduced into said device;

second signal input means on which a signal to cause forward movement of the record media may be introduced into said device;

a first OR gate, one of the inputs of which is connected to the first signal input means;

a second OR gate, one of the inputs of which is connected to the second signal input means;

signal generating means connected to the outputs of the first and second OR gates and capable of producing a signal of predetermined duration in response to a predetermined combination of output signals from the first and second OR gates;

third and fourth OR gates, one input of each of which is connected to the output of the signal generating means;

bistable means having a first and second input connected to the output of the third and fourth OR gates, respectively, and having first and second outputs;

fifth and sixth OR gates, one input of each of which is connected to the first and second outputs of the bistable means, respectively, the outputs of the fifth and sixth OR gates serving as outputs of said device for the backward control signal and the forward control signal, respectively;

means connecting the first signal input means to a second input of the fifth OR gate;

means connecting the second signal input means to a second input of the sixth OR gate;

first delay means connecting the first signal input means to a second input of the fourth OR gate;

second delay means connecting the second signal input means to a second input of the third OR gate;

means connecting the first output of the bistable means to a second input of the second OR gate; and means connecting the second output of the bistable means to a second input of the first OR gate, whereby said device is capable of immediate transmission of a record media moving signal when the desired direction of movement of the record media is the same as the direction in which the record media was last moved, and whereby said device is capable of delaying a record media moving signal when the desired direction of movement of the record media is opposite to the direction in which the record media was last moved.

6. In a device of the class described, constructed and arranged to control the feeding of record media in the forward and backward directions, and to cause a delay in exercise of said control when there is a change in the direction of feeding, the combination comprising first output means on which a signal for causing feeding of the record media in a forward direction may be produced, said first output means having at least two inputs;

second output means on which a signal for causing feeding of the record media in a backward direction may be produced, said second output means having at least two inputs;

bistable means having two inputs and two outputs connected to a first input of the first output means and to a first input of the second output means, respectively, and being capable of changing the signals on its outputs in response to a change of signals on its inputs;

first control means associated with a first input of the bistable means, and having at least two inputs;

second control means associated with a second input of the bistable means, and having at least two inputs;

first gating means having an output and at least two inputs, a first one of which is connected to an output of the bistable means;

second gating means having an output and at least two inputs, a first one of which is connected to an output of the bistable means;

signal generating means having a plurality of inputs, two of which are connected to the outputs of the first and second gating means, and having outputs connected to first inputs of the first and second control means, said signal generating means being capable of producing a signal of predetermined length in response to a predetermined combination of signals applied to its inputs;

first signal input means on which a signal for causing feeding of the record media in a forward direction may be received, said first signal input means being connected to a second input of the first gating means, to a second input of the first control means, and to a second input of the first output means; and second signal input means on which a signal for causing feeding of the record media in a backward direction may be received, said second signal input means being connected to a second input of the second gating means, to a second input of the second control means, and to a second input of the second output means, whereby said device is capable of immediate transmission of a record media moving signal when the desired direction of movement of the record media is the same as the direction in which the record media was last moved, and whereby said device is capable of delaying a record media moving signal when the desired direction of movement of the record media is opposite to the direction in which the record media was last moved.

7. In a device of the class described, constructed and arranged to control the feeding of record media in the forward and backward directions, and to cause a delay in exercise of said control when there is a change in the direction of feeding, the combination comprising first ouput means on which a signal for causing feeding of the record media in a forward direction may be produced, said first output means having at least two inputs;

second output means on which a signal for causing feeding of the record media in a backward direction may be produced, said second output means having at least two inputs;

bistable means having two inputs and two outputs connected to a first input of the first output means and to a first input of the second output means, respectively, and being capable of changing the signals on its outputs in response to a change of signals on its inputs;

first control means associated with a first input of the bistable means, and having at least two inputs;

second control means associated with a second input of the bistable means, and having at least two inputs;

signal generating means having a plurality of inputs, two of which are connected to the outputs of the bistable means, and having outputs connected to first inputs of the first and second control means, said signal generating means being capable of producing a signal of predetermined length in response to a predetermined combination of signals applied to its inputs;

first signal input means on which a signal for causing feeding of the record media in a forward direction may be received, said first signal input means being connected to a first input of the signal generating means, to a second input of the first control means, and to a second input of the first output means; and second signal input means on which a signal for causing feeding of the record media in a backward direction may be received, said second signal input means being connected to a second input of the signal generating means, to a second input of the second control means, and to a second input of the second output means, whereby said device is capable of immediate transmission of a record media moving signal when the desired direction of movement of the record media is the same as the direction in which the record media was last moved, and whereby said device is capable of delaying a record media moving signal when the desired direction of movement of the record media is opposite to the direction in which the record media was last moved.

8. In a device of the class described, constructed and arranged to control the feeding of record media in the forward and backward directions, and to cause a delay in exercise of said control when there is a change in the direction of feeding, the combination comprising first signal input means on which a signal to cause backward movement of the record media may be introduced into said device;

second signal input means on which a signal to cause forward movement of the record media may be introduced into said device;

first signal output means having at least two inputs and having at least one output on which a signal to cause backward movement of the record media may be produced;

second signal output means having at least two inputs and having at least one output on which a signal to cause forward movement of the record media may be produced;

first operating means connecting the first signal input means to the first signal output means and effective to cause production of an immediate backward-movement signal from the first signal output means in the event that the last-preceding movement signal has also been a backward movement signal;

second operating means connecting the second signal input means to the second signal output means and effective to cause production of an immediate forward-movement signal from the second signal output means in the event that the last-preceding movement signal has also been a forward-movement signal;

signal generating means associated with the first and second signal input means and capable of producing an output signal of predetermined duration in response to a predetermined combination of input signals; and third operating means having a pair of outputs which are connected to inputs of the first and second signal output means, said third operating means being associated with the signal generating means and effective to cause a delay of a predetermined time interval corresponding to the duration of the output signal of the signal generating means in production of an output signal on one of the signal output means in response to an input signal on its corresponding signal input means in the event that the input signal is for causing movement of the record media in a direction opposite to the direction of movement caused by the last-preceding signal.

9. In a device of the class described, constructed and arranged to control the feeding of record media in the forward and backward directions, and to cause a delay in exercise of said control when there is a change in the direction of feeding, the combination comprising first signal input means on which a signal to cause backward movement of the record media may be introduced into said device;

second signal input means on which a signal to cause forward movement of the record media may be introduced into said device;

first signal output means having at least two inputs and having at least one output on which a signal to cause backward movement of the record media may be produced;

second signal output means having at least two inputs and having at least one output on which a signal to cause forward movement of the record media may be produced;

first operating means connecting the first signal input means to the first signal output means and effective to cause production of an immediate backward-movement signal from the first signal output means in the event that the last preceding movement signal has also been a backward-movement signal;

second operating means connecting the second signal input means to the second signal output means and effective to cause production of an immediate forward-movement signal from the second signal output means in the event that the last preceding movement signal has also been a forward-movement signal; and third operating means having a pair of outputs which are connected to inputs of the first and second signal output means, said third operating means being effective to cause a delay of a predetermined time interval in production of an output signal on one of the signal output means in response to an input signal on its corresponding signal input means in the event that said signal is for causing movement of the record media in a direction opposite to the direction of movement caused by the last-preceding signal.

References Cited

UNITED STATES PATENTS

| | | | |
|---|---|---|---|
| 2,574,218 | 11/1951 | Lynch | 179—100.2 |
| 3,001,733 | 9/1961 | Axon | 179—100.2 |
| 3,070,321 | 12/1962 | Bara | 242—55.12 |

DARYL W. COOK, *Acting Primary Examiner.*

MAYNARD R. WILBUR, *Examiner.*

R. COUNCIL, *Assistant Examiner.*